United States Patent
Xuan et al.

[11] Patent Number: 5,945,197
[45] Date of Patent: Aug. 31, 1999

[54] LASER TEXTURING OF MAGNETIC RECORDING MEDIUM USING MULTIPLE LENS FOCUSING

[75] Inventors: Jialuo Jack Xuan, Milpitas; Ga-Lane Chen, Fremont, both of Calif.

[73] Assignee: Seagate Technology, Scotts Valley, Calif.

[21] Appl. No.: 08/957,812

[22] Filed: Oct. 27, 1997

Related U.S. Application Data

[62] Division of application No. 08/666,374, filed as application No. PCT/US96/06829, May 9, 1996.

[51] Int. Cl.$^6$ ........................................................ G11B 5/82
[52] U.S. Cl. .................... 428/141; 428/65.5; 428/65.6; 428/65.7; 428/65.8; 428/694 TR; 428/694 SG; 428/694 TC; 428/900; 360/135
[58] Field of Search .................. 428/65.5, 65.6, 428/65.7, 141, 65.8, 694 TR, 694 SG, 694 TC, 900; 360/135

[56] References Cited

U.S. PATENT DOCUMENTS

| | | |
|---|---|---|
| 3,674,340 | 7/1972 | Jacob . |
| 3,764,218 | 10/1973 | Schedewie . |
| 3,938,878 | 2/1976 | Fox . |
| 4,060,306 | 11/1977 | Swaminathan . |
| 4,139,263 | 2/1979 | Lehureau et al. . |
| 5,062,021 | 10/1991 | Ranjan et al. . |
| 5,128,914 | 7/1992 | Kurata et al. . |
| 5,166,006 | 11/1992 | Lal et al. . |
| 5,202,810 | 4/1993 | Nakamura et al. . |
| 5,402,407 | 3/1995 | Eguchi et al. . |
| 5,416,755 | 5/1995 | Endo et al. . |
| 5,768,076 | 6/1998 | Baumgart et al. ....................... 360/135 |

FOREIGN PATENT DOCUMENTS

| | | |
|---|---|---|
| 0447025 A1 | 9/1991 | European Pat. Off. . |
| 0652554 A1 | 5/1995 | European Pat. Off. . |

OTHER PUBLICATIONS

P. Baumgart et al., "A New Laser Texturing Technique for High Performance Magnetic Disk Drives," IEEE Transactions on Magnetics, vol. 31, No. 6, pp. 2946–2951, Nov., 1955.

*Primary Examiner*—Stevan A. Resan
*Attorney, Agent, or Firm*—McDermott, Will & Emery

[57] ABSTRACT

A magnetic recording medium is textured with a pulsed laser light beam through a multiple lens focusing system. The use of a multiple lens focusing system enables the formation of a plurality of relatively uniform protrusions smaller than those obtained with a single lens focusing system, thereby avoiding abrupt local profile changes. In an embodiment, the laser light beam is split, as by offsetting the lenses, to obtain a plurality of pairs of even smaller protrusions than obtained with a laser light beam having a centralized energy profile. The pulsed, multiple lens focused laser light beam can be used to texture a substrate, underlayer or magnetic layer. The resulting laser textured magnetic recording medium exhibits improved flying stability, glide performance and reliability.

17 Claims, 4 Drawing Sheets

LASER TEXTURING OF MAGNETIC RECORDING MEDIUM USING MULTIPLE LENS FOCUSING

This application is a division of application Ser. No. 08/666,374 filed Jun. 27, 1996 which is a Rule 371 application of PCT/US96/06829 filed May 9, 1996.

TECHNICAL FIELD

The present invention relates to the recording, storage and reading of magnetic data, particularly rotatable magnetic recording media, such as thin film magnetic disks having textured surfaces for contact with cooperating magnetic transducing heads. The invention has particular applicability to high density magnetic recording media exhibiting low noise and having improved flying stability, glide performance and head-media interface reliability.

BACKGROUND ART

Magnetic disks and disk drives are conventionally employed for storing data in magnetizable form. Typically, one or more disks are rotated on a central axis in combination with data transducing heads positioned in close proximity to the recording surfaces of the disks and moved generally radially with respect thereto. Magnetic disks are usually housed in a magnetic disk unit in a stationary state with a magnetic head having a specific load elastically in contact with and pressed against the surface of the disk.

In operation, the magnetic disk is normally driven by the contact start stop (CSS) method, wherein the head begins to slide against the surface of the disk as the disk begins to rotate. Upon reaching a predetermined high rotational speed, the head floats in air at a predetermined distance from the surface of the disk due to dynamic pressure effects caused by the air flow generated between the sliding surface of the head and the disk. During reading and recording operations, the transducer head is maintained at a controlled distance from the recording surface, supported on a bearing of air as the disk rotates. The magnetic head unit is arranged such that the head can be freely moved in both the circumferential and radial directions of the disk in this floating state allowing data to be recorded on and retrieved from the surface of the disk at a desired position.

Upon terminating operation of the disk drive, the rotational speed of the disk decreases and the head begins to slide against the surface of the disk again and eventually stops in contact with and pressing against the disk. Thus, the transducer head contacts the recording surface whenever the disk is stationary, accelerated from a stop and during deceleration just prior to completely stopping. Each time the head and disk assembly is driven, the sliding surface of the head repeats the cyclic operation consisting of stopping, sliding against the surface of the disk, floating in the air, sliding against the surface of the disk and stopping.

It is considered desirable during reading and recording operations to maintain each transducer head as close to its associated recording surface as possible, i.e., to minimize the flying height of the head. This objective becomes particularly significant as the areal recording density increases. The areal density (Mbits/in$^2$) is the recording density per unit area and is equal to the track density (TPI) in terms of tracks per inch times (x) the linear density (BPI) in terms of bits per inch. Thus, a smooth recording surface is preferred, as well as a smooth opposing surface of the associated transducer head, thereby permitting the head and the disk to be positioned in closer proximity with an attendant increase in predictability and consistent behavior of the air bearing supporting the head. However, another factor operates against that objective. If the head surface and recording surface are too flat, the precision match of these surfaces gives rise to excessive stiction and friction during the start up and stopping phases, thereby causing wear to the head and recording surfaces eventually leading to what is referred to as a "head crash." Thus, there are competing goals of reduced head/disk friction and minimum transducer flying height.

In order to satisfy these competing objectives, the recording surfaces of magnetic disks are conventionally provided with a roughened surface to reduce the head/disk friction by techniques referred to as "texturing." Conventional texturing techniques involve polishing the surface of a disk substrate to provide a texture thereon prior to subsequent deposition of layers, such as an underlayer which is typically chromium or a chromium-alloy, a magnetic layer, a protective overcoat which typically comprises carbon, and a lubricant topcoat, wherein the textured surface on the substrate is intended to be substantially replicated on the surface of the magnetic disk.

A typical magnetic recording medium is depicted in FIG. 1 and comprises a substrate 10, typically an aluminum (Al)-base alloy, such as an aluminum-magnesium (Al—Mg) alloy, plated with a layer of amorphous nickel-phosphorous (NiP). Substrate 10 typically contains sequentially deposited thereon a chromium (Cr) underlayer 11, a magnetic layer 12 which is usually a cobalt (Co)-base alloy, a protective overcoat 13 which usually comprises carbon, and a lubricant topcoat 14. Cr underlayer 11, Co-base alloy magnetic layer 12 and protective carbon overcoat 13 are typically deposited by sputtering techniques. A conventional Al-alloy substrate is provided with a NiP plating primarily to increase the hardness of the Al substrate, serving as a suitable surface for polishing to provide the requisite surface roughness or texture, which is substantially reproduced on the disk surface.

The escalating requirements for high areal recording density impose increasingly greater requirements on thin film magnetic media in terms of coercivity, stiction squareness, low medium noise and narrow track recording performance. In addition, increasingly high density and large-capacity magnetic disks require increasingly small flying heights, i.e., the distance by which the head floats above the surface of the disk in the CSS drive. The requirement to further reduce the flying height of the head imposed by increasingly higher recording density and capacity render it particularly difficult to satisfy the requirements for controlled texturing to avoid head crash.

Conventional texturing techniques comprise a mechanical operation, such as polishing. See, for example, Nakamura et al., U.S. Pat. No. 5,202,810. However, conventional mechanical texturing techniques are attendant with numerous disadvantages. For example, it is extremely difficult to provide a clean textured surface due to debris formed by mechanical abrasions. Moreover, the textured surface is inevitably scratched during mechanical operations, resulting in poor glide characteristics and higher defects. In addition, various desirable substrates are difficult to process by mechanical texturing. This undesirably limiting facet of mechanical texturing, virtually excludes the use of many substrates as well as conductive graphite substrates which facilitate achieving high coercivities.

In copending application Ser. No. 08/608,072, filed on Feb. 28, 1996, a sputter texturing method is disclosed. The disclosed sputter texturing method can be advantageously applied to a plurality of different substrates.

Another alternative texturing technique to mechanical texturing comprises laser texturing by impinging a pulsed, focused laser light beam on a layer of a magnetic recording medium, such as an upper surface of a non-magnetic substrate. See, for example, Ranjan et al., U.S. Pat. No. 5,062,021, wherein the disclosed method comprises polishing an NiP plated Al substrate to a specular finish, and rotating the substrate while directing pulsed laser energy over a limited portion of the radius, thereby providing a textured landing zone leaving the data zone specular. The landing zone comprises a plurality of individual laser spots characterized by a central depression surrounded by a substantially circular raised rim.

Another laser texturing technique is reported by Baumgart et al. "A New Laser Texturing Technique for High Performance Magnetic Disk Drives," IEEE Transactions on Magnetics, Vol. 31, No. 6, pp. 2946–2951, November 1995. The laser texturing technique disclosed by Baumgart et al. comprises impinging a pulsed laser light beam through a single lens focusing system on a substrate surface. Baumgart et al. disclose that the shape of the resulting protrusions is altered by adjusting the pulse energy. At low pulse energies, the bump or protrusion shape comprises a central depression and a surrounding rim, similar to that reported by Ranjan et al. As the pulse energy increases, the bottom of the depression flattens into a rounded, smooth, central dome resembling a "sombrero." At higher powers, the central dome broadens and decreases in height to eventually become equal to or lower than the rim.

A profile of a protrusion formed by the laser texturing technique as reported by Ranjan et al. is shown in FIG. 2, and comprises a substantially circular rim 23 extending above surface 21 surrounding central depression 20. The depth d of depression 20 below upper surface 21 is reported by Ranjan et al. as typically about twice the rim height h.

The variation in protrusion shape reported by Baumgart et al. is shown in FIG. 3 which depicts a sequence of atomic force microscope (AFM) cross sections of protrusions created at different incident laser pulse energies in microjoules ($\mu$j).

Laser surface texturing affords an advantageous degree of control unavailable with mechanical texturing. Moreover, the accuracy of a laser light beam provides a precise delineation of the textured area boundaries, thereby enabling the accurate and reproducible formation of textured landing zones while maximizing the area available for data storage. The rounded protrusions reported by Ranjan et al. enable control of head/disk spacings while reducing friction and wear. The generally circular depressions and surrounding rims are also reported by Ranjan et al. to further reduce frictional wear by acting as areas of collection for debris and lubricant coated on the disk.

However, conventional laser texturing techniques, such as those disclosed by Ranjan et al. and Baumgart et al., suffer from several disadvantages. The geometric configuration of the topographical protrusions formed by such conventional laser texturing techniques employing a single lens focusing system result from the rapid centralized melting and thermal degradation from the center of the focused laser spot to the edge of the spot. Such single lens focusing systems generate a textured area having relatively large topographical protrusions and characterized by rather abrupt local profile changes that adversely affect the flying stability and glide performance of magnetic-recording heads, and detrimentally impact the reliability of the head-medium interface. Such problematic abrupt local profile changes require greater precision in texturing a magnetic recording medium by providing a uniform pattern of protrusions smaller than those obtained by conventional laser texturing techniques.

In copending application Ser. No. 08,647,407 filed on May 9, 1996, a method of laser texturing a magnetic recording medium is disclosed, wherein a focused laser light beam is passed through an optical crystal material interposed and spaced apart between a lens focusing system surface undergoing laser texturing. The use of an optical crystal material enables formation of a texture comprising a plurality of controlled and accurately spaced apart protrusions.

Swaminathan, U.S. Pat. No. 4,060,306 discloses the use of a multiple lens system, including an aplanatic meniscus lens and a companion doublet lens, for use in a microscope. The use of multiple lens systems for reading or writing disk drive data is disclosed by Euguchi et al., U.S. Pat. No. 5,402,407, Kurata et al., U.S. Pat. No. 5,128,914 and Endo et al., U.S. Pat. No. 5,416,755.

Accordingly, there exists a need for a texturing system, particularly a laser texturing system, capable of providing a topography comprising a plurality of controlled, relatively small protrusions of uniform height, thereby affording improved flying stability, glide performance and reliability.

DISCLOSURE OF THE INVENTION

An object of the present invention is a textured magnetic recording medium exhibiting low noise and improved flying stability, glide performance and head-medium interface reliability.

Another object of the present invention is a method of laser texturing a non-magnetic substrate to provide a textured magnetic recording medium exhibit low noise, and improved flying stability, glide performance and head-medium interface reliability.

Additional objects, advantages and other features of the invention will be set forth in part in the description which follows and in part will become apparent to those having ordinary skill in the art upon examination of the following or may be learned from the practice of the invention. The objects and advantages of the invention may be realized and obtained as particularly pointed out in the appended claims.

According to the present invention, the foregoing and other objects are achieved in part by a magnetic recording medium comprising: a non-magnetic substrate having a textured upper surface; and a magnetic layer formed on the upper surface; wherein the textured upper surface comprises a plurality of protrusions, extending above the upper surface to a height of about 75 Å to about 300 Å and having a substantially circular rim with a diameter of about 3 $\mu$m to about 15 $\mu$m, around a central hole extending into the upper surface.

Another aspect of the present invention is a method of manufacturing a magnetic recording medium, which method comprises: texturing an upper surface of a non-magnetic substrate by exposing the upper surface to a pulsed laser light beam through a multiple lens focusing system containing a first lens and a second lens spaced apart from and positioned between the first lens and the upper surface of the substrate.

A further aspect of the present invention a method of manufacturing a magnetic recording medium, which method comprises texturing an upper surface of a non-magnetic substrate by exposing the upper surface to a pulsed laser light beam through a multiple lens focusing system comprising a first lens and a second lens spaced apart from and positioned between the first lens and the upper surface of the substrate, wherein the laser light beam has an energy profile with at least two energy peaks forming at least two protrusions on the upper surface, each such protrusion having a substantially circular rim extending above the upper surface to a height less than the height of a substantially single protrusion generated by exposing the upper surface to a laser light beam having a centralized energy profile with a substantially single energy peak.

Additional objects and advantages of the present invention will become readily apparent to those skilled in this art from the following detailed description, wherein the embodiments of the invention are described, simply by way of illustration of the best mode contemplated for carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

DESCRIPTION OF THE INVENTION

Figure 1:
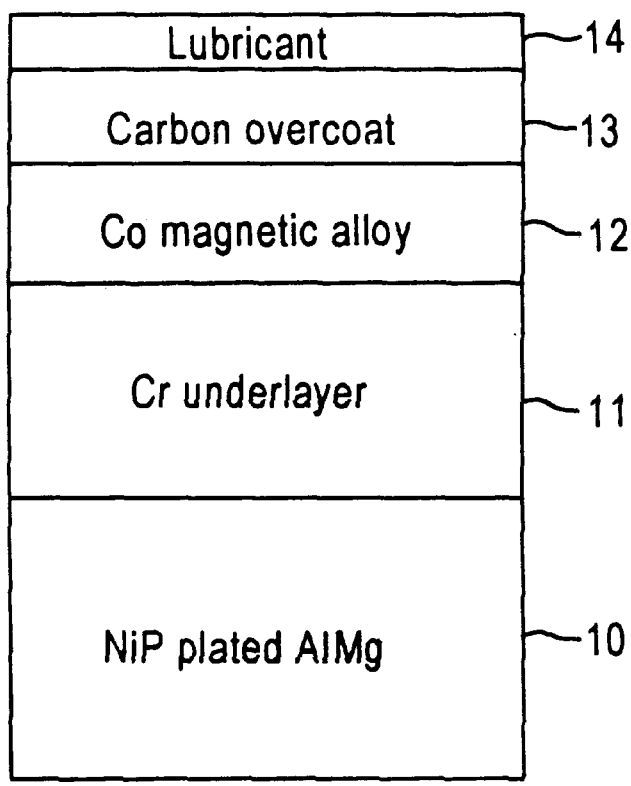
FIG. 1 depicts a conventional magnetic recording medium structure.
Figure 2:
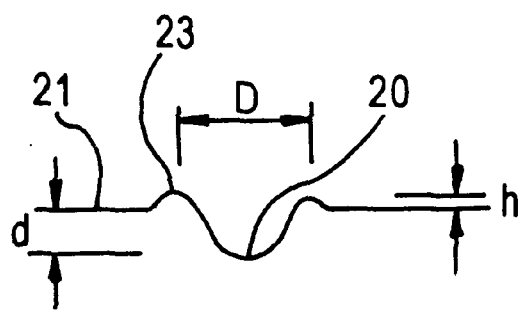
FIG. 2 is a schematic view of the profile of a protrusion formed by a conventional laser texturing technique.
Figure 3:
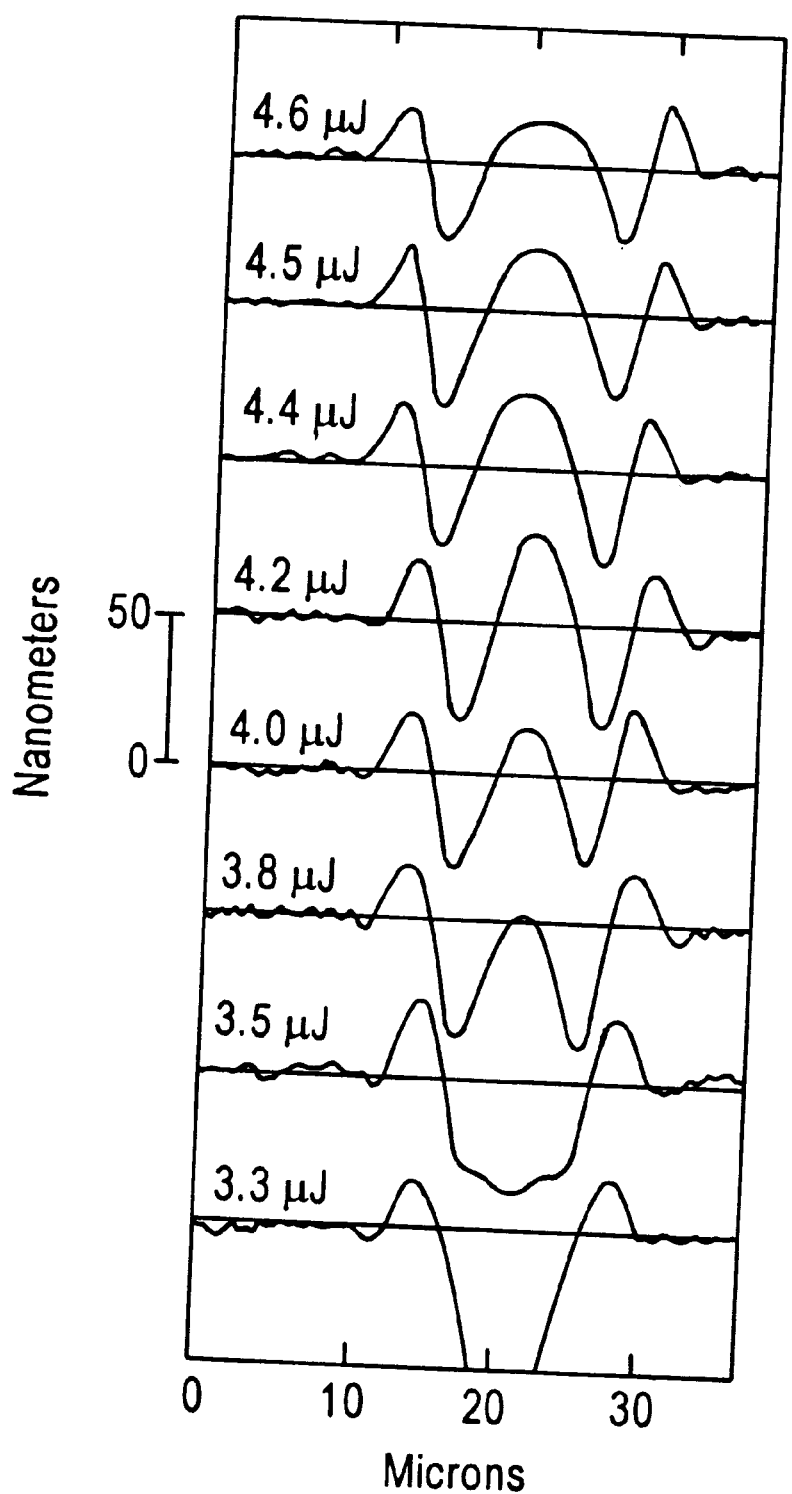
FIG. 3 demonstrates the variation in protrusion geometry as a function of laser pulse energies in accordance with a conventional laser texturing technique.

Conventional laser texturing techniques alter the topography of a non-magnetic substrate by generating a plurality of protrusions having a substantially circular rim surrounding a central hole or surrounding a central bump. After extensive investigation and experimentation, it was found that such a laser generated texture comprises protrusions characterized by abrupt profile changes, thereby adversely affecting flying stability, glide performance and head-medium interface reliability. After further extensive investigation of such abrupt profile changes, it was found that the tolerances associated with conventional laser texturing systems were inadequate to satisfy the requirements of high areal density magnetic recording media. It is believed that such abrupt profile changes stem from various sources of surface nonuniformity. Basically, the substrate surface inherently contains a certain degree of waviness apparently due to manufacturing techniques. Moreover, as a magnetic recording disk rotates, an inevitable amount of wobble occurs due to its associated disk drive. In addition, lack of surface uniformity results from clamping a disk during rotation. These factors adversely affect surface uniformity, thereby requiring a high degree of flexibility or tolerance during laser texturing, which cannot be achieved with conventional laser texturing systems.

The present invention overcomes such problems with a laser texturing system capable of providing a magnetic recording medium with a topography comprising a plurality of precisely controlled protrusions which are smaller than those formed by conventional laser texturing techniques. In accordance with the present invention, a laser texturing system is provided with a focusing system having a greater depth of focus than previously employed, thereby providing the requisite tolerance and flexibility to accommodate inherent surface nonuniformity. Magnetic recording media produced in accordance with the present invention contain a textured topography comprising a plurality of uniformly controlled protrusions with dramatically reduced abrupt profile changes and, hence, reduced air turbulence. The resulting textured magnetic recording medium exhibits low noise, improved flying stability, glide performance and head-medium interface reliability. The laser generated protrusions formed in accordance with the present invention are generally smaller than those formed by conventional laser texturing techniques, thereby improving head-medium interface reliability by providing a greater number of contact points and, hence, less load and less wear per contact. Moreover, the laser textured surface formed in accordance with the present invention comprises a greater number of protrusions per unit area, thereby enabling the advantageous use of smaller head sliders.

A laser texturing technique in accordance with the present invention comprises a multiple lens focusing system having a greater depth of focus than that employed in conventional laser texturing techniques, thereby enabling the formation of protrusions greater in number and smaller in size than the protrusions generated by conventional laser texturing techniques. The multiple lens focusing system of the present invention is designed to have an f number which is lower than the f number of a conventional single lens laser focusing system, thereby providing a greater depth of focus and, hence, a greater tolerance for accommodating inherent surface nonuniformity.

In an embodiment of the present invention, the multiple laser focusing system comprises a first lens and a second lens spaced apart and positioned between the first lens and the upper surface of the rotating substrate to be textured, so that the multiple lens focusing system has a depth of focus greater than that of the first lens. The first lens of the multiple lens focusing system of the present invention can comprise a companion doublet lens, and the second lens can comprise an aplanatic meniscus lens. The depth of focus of the multiple lens focusing system of the present invention can range from about 30 to about 150 $\mu$m. In an embodiment of the present invention wherein the first lens is a companion doublet lens and the second lens in an aplanatic meniscus lens, the depth of focus is about 50 $\mu$m.

A method of laser texturing in accordance with the present invention comprises the use of conventional equipment, including conventional laser sources. For example, a multimode Q-switched pulsed laser can be employed when texturing a NiP plated Al-alloy substrate. One having ordinary skill in the art can easily optimize the power input and pulse duration in a particular situation. For example, a pulse of about 30,000 to about 70,000 pulses per second is generally sufficient to produce a desirable texture.

The multiple lens laser focusing system of the present invention can be advantageously employed to texture any of various conventional substrates employed in the production of magnetic recording media. The textured surface of the substrate is substantially replicated on subsequently deposited layers, such as an underlayer, magnetic layer, protective overcoat and lubricant topcoat. In an embodiment of the present invention, a selected portion of a substrate surface is laser textured to provide a landing zone. Thus, by restricting the laser texturing treatment area to a specific landing zone, recording areas or data zones can be maximized and provided with extremely smooth or specular surfaces, thereby increasing recording density and further reducing head flying height.

Figure 4:
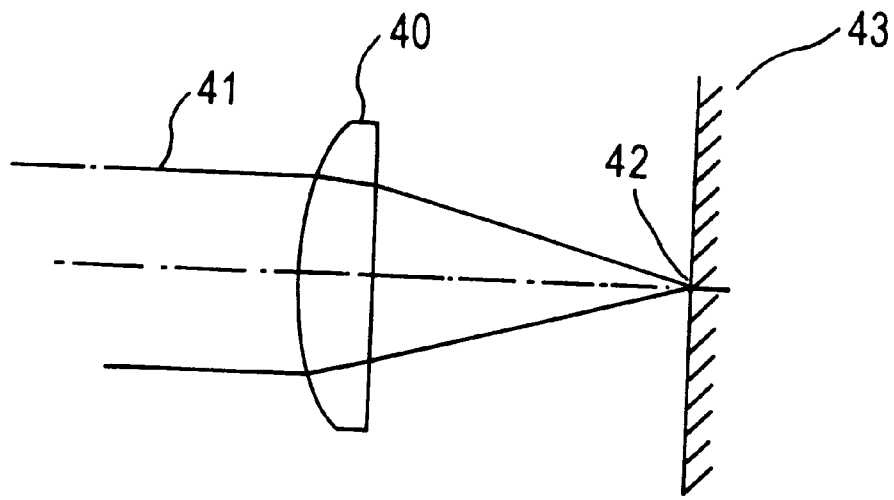
FIG. 4 schematically depicts a conventional single lens laser focusing system.

A portion of a conventional laser texturing apparatus comprising a single lens focusing system is schematically illustrated in FIG. 4 and comprises a single lens 40. Laser light beam 41 is focused at point 42 at an upper surface of non-magnetic substrate 43 resulting in a surface topography of relatively large protrusions characterized by abrupt profile changes stemming from inherent surface uniformity. Such abrupt local profile changes adversely affect flying stability, glide performance and head-medium interface reliability.

Figure 5:
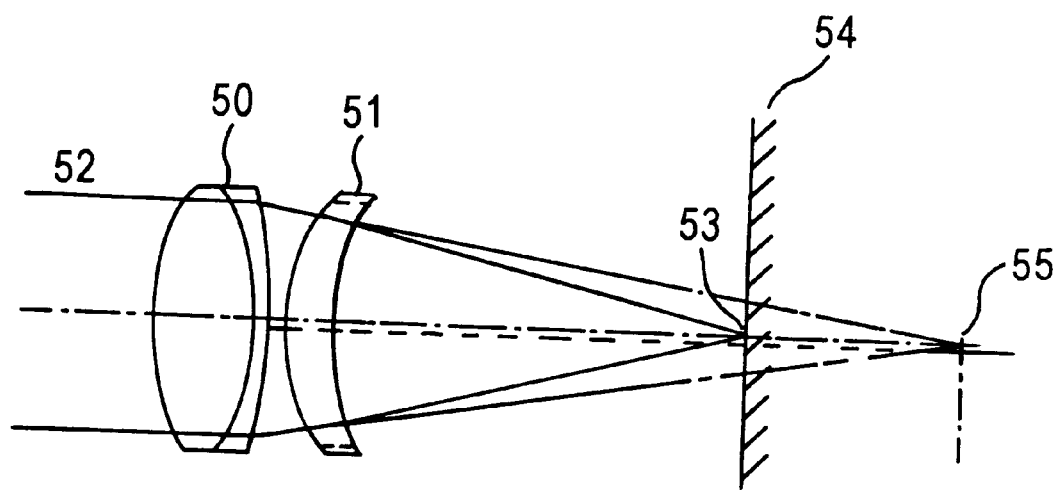
FIG. 5 schematically depicts a multiple lens laser focusing system of the present invention.

A portion of a multiple lens focusing system in accordance with the present invention is schematically illustrated in FIG. 5 and comprises a first lens 50, such as a companion doublet, and a second lens 51, such as an aplanatic meniscus lens. Second lens 51 is spaced apart and positioned between first lens 50 and substrate 54. First lens 50 has a focal point at the upper surface of substrate 54, as at 53. However, the depth of focus of the multiple lens focusing system is extended by virtue of second lens 51 to point 55. The increased depth of focus provides the desired flexibility, enabling the formation of protrusions having a smaller height and diameter with greater precision and uniformity vis-à-vis the single lens focusing system of the prior art depicted in FIG. 4. Significantly, by providing an increased depth of focus, adjustment and maintenance of the focus is facilitated, thereby providing a tolerance to accommodate inherent surface uniformity which is unattainable in prior art single lens laser focusing systems. Accordingly, the present invention overcomes the abrupt profile changes and, consequential, air turbulence characteristic of conventional laser textured surfaces of magnetic recording media.

Figure 6:
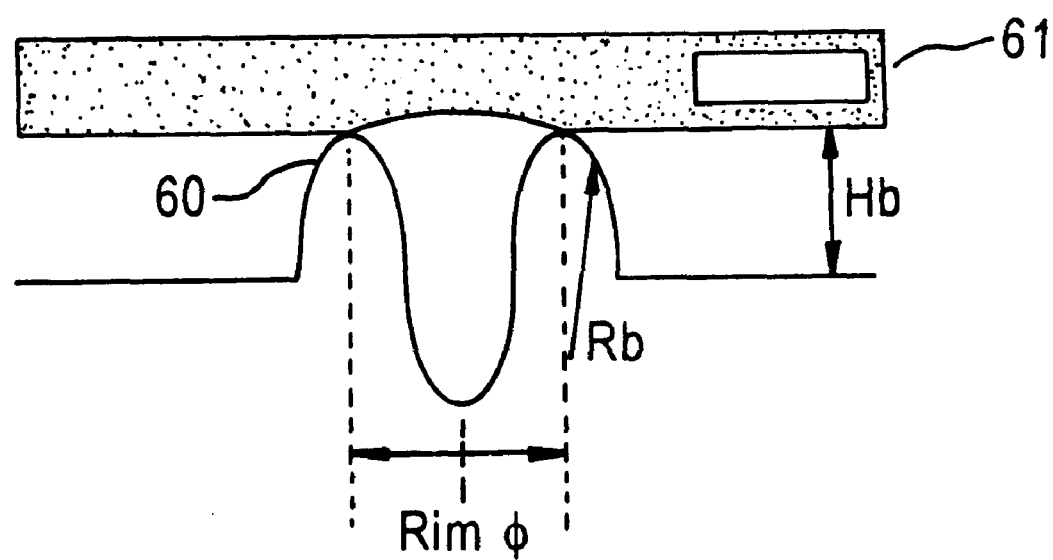
FIG. 6 schematically illustrates a protrusion formed in accordance with the present invention.

A typical protrusion formed in accordance with the present invention is depicted in FIG. 6 and is characterized by rim 60 having a rim diameter φ and a radius of curvature Rb. Head slider 61 contacts the protrusion 60 at rim height Hb.

The protrusions formed in accordance with the present invention generally have a rim height of about 75 Å to about 300 Å. In an embodiment of the present invention, protrusions are formed with a rim height of about 150 Å to about 225 Å. The rim diameter of the protrusions formed in accordance with the present invention can range from 3 μm to about 15 μm. In an embodiment of the present invention, protrusions are formed having a rim diameter of 5 μm to about 8 μm. Protrusions formed in accordance with the present invention have rims with a radius of curvature which can generally range from about 5 μm to about 200 μm. In an embodiment of the present invention, the rims have a radius of curvature of about 50 μm to about 70 μm.

The laser textured topography of the present invention comprises protrusions with substantially circular rims around central holes which do not extend into the substrate as deep as the central holes of conventional laser textures. In accordance with the present invention, the ratio of the distance the central hole extends into the substrate to the rim height ranges from less than about 1:1 to less than 3:1. The present invention easily achieves a ratio of the distance of the central hole into the substrate to the rim height of less than about 2:1, including about 1:1. In a conventional laser textured topography, the central holes extend into the substrate a distance considerably greater than the height of the rim. The resulting asymmetric configuration of conventional laser textures provides an undesirable stress profile when subsequent layers, such as an underlayer and/or magnetic layer, are deposited by sputtering at elevated temperatures. As a result, the topography produced on the upper surface of the substrate is not accurately reproduced in the subsequently deposited layers. However, in accordance with the present invention, the textured topography exhibits a symmetrical configuration, thereby enabling the texture to be substantially accurately reproduced in subsequently deposited sputtered layers.

The geometric configuration and dimensions of the laser textured topography formed in accordance with the present invention is functionally significant with respect to improved flying stability, glide performance and head-medium interface reliability. The particular geometric configuration and dimensions of the topography enable optimization of tribology and wear characteristics.

In the embodiments of the present invention discussed supra, the substrate is exposed to a pulsed laser light beam through a multiple lens focusing system while rotating the substrate. The impinging laser light beam has a centralized energy profile generating a substantially single protrusion. In other embodiments of the present invention, a substrate is exposed to a pulsed laser light beam through a multiple lens focusing system, however, the original centralized beam energy distribution over the impinging spot area is modified to obtain at least two smaller energy peaks. In accordance with such embodiments of the present invention, at least two protrusions are formed which are smaller in size than the single protrusion formed by an unmodified laser light beam having a centralized energy profile generating a substantially single protrusion. In this way, tribological performance and reliability are further improved by providing a laser textured topography having an even greater number of smaller protrusions.

In one aspect of the modified energy embodiment, the first and second lenses are offset relative to each other, thereby producing at least two smaller energy peaks generating two or more protrusions on the substrate surface. The resulting laser textured topography comprising a greater number of smaller protrusions provides superior tribological performance in terms of head flying stability due to less air turbulence, in addition to improved reliability due to less load and less wear per contact between the head and the medium surface. Advantageously, when generating a laser light beam with multiple energy peaks, a high repetition rate laser pulse enables the formation of a smaller spot with even greater precision. Multiple protrusion formation can also be obtained by other techniques, such as by changing the mode of a multiple mode Q-switched pulse laser, or by changing the optical train as by interposing a mask between the laser light source and first lens.

The laser texturing technique of the present invention can be employed to textured a magnetic recording medium by impinging a focused laser beam not only on a rotating substrate, as in the embodiments previously disclosed, but on any layer of the magnetic recording medium. Thus, in accordance with the present invention, an underlayer, such as a Cr or Cr-alloy underlayer, or magnetic layer, such as a Co-alloy magnetic layer applied on an underlayer or directly on a substrate, can be laser textured with a pulsed laser light beam through a multiple lens focusing system. The laser texture of the present invention can also be provided on an Al or Al-alloy substrate prior to plating with NiP. The laser textured surface provided in accordance with the present invention is substantially replicated in subsequently deposited layers.

The magnetic recording media produced in accordance with the present invention can comprise any of various conventional substrates employed in the production of magnetic recording media. Such conventional substrates include NiP plated Al or Al-alloys, such as Al—Mg-alloys.

The magnetic layers deposited in accordance with the present invention can be any of those conventionally employed in the production of magnetic recording media. Such conventional magnetic alloys, include, but are not limited to, cobalt (Co)-base alloys, such as cobalt-chromium (CoCr), cobalt-samarium (CoSm), cobalt-chromium-tantalum (CoCrTa), cobalt-nickel-chromium (CoNiCr), cobalt-chromium-samarium (CoCrSm), cobalt-chromium-platinum-tantalum (CoCrPtTa), cobalt-chromium-platinum (CoCrPt), cobalt-nickel-platinum (CoNiPt), cobalt-nickel-chromium-platinum (CoNiCrPt) and cobalt-chromium-platinum-boron (CoCrPtB). The thickness of the magnetic layer is consistent with conventional practices and manufacturing a magnetic recording medium. Cobalt-base is alloys having a thickness of about 100 Å to about 1000 Å, such as 200 Å to about 500 Å, has been found suitable.

As in conventional practices, an underlayer can be deposited on the textured substrate prior to depositing the magnetic layer. The underlayer can comprise Cr or a Cr-alloy, such as chromium-vanadium or chromium-titanium, oxygen-doped Cr, tungsten or a tungsten alloy.

In addition, a protective overcoat, such as a carbon overcoat, can be deposited on the magnetic layer, and a lubricant topcoat deposited on the protective overcoat. The underlayer, magnetic layers and protective overcoat can be applied in a conventional manner, by any of various sputtering techniques employed in production of magnetic recording media.

The present invention can be employed to produce any of various types of magnetic recording media including thin film disks, with an attendant improvement in flying stability, glide performance and head-medium interface reliability. Moreover, the precise manner in which a landing zone can be laser textured enables an increase in recording density and reduction in the size of head sliders.

Only certain embodiments of the invention and but a few examples of its versatility are shown and described in the present invention is capable of use in various other combinations and environments and is capable of changes or modifications within the scope of the inventive concept as expressed herein.

We claim:

1. A magnetic recording medium comprising:
    a non-magnetic substrate having a textured upper surface; and
    a magnetic layer formed on the upper surface; wherein, the textured upper surface contains a plurality of protrusions extending above the upper surface to a height of about 75 Å to about 300 Å and having a substantially circular rim, with a diameter of about 3 μm to about 15 μm, around a central hole extending into the upper surface, and the ratio of the distance the central hole extends into the substrate to the rim heiqht is equal to or less than about 1:1.

2. The magnetic recording medium according to claim 1, wherein the textured upper surface comprises a landing zone.

3. The magnetic recording medium according to claim 1, wherein the rim has a radius of curvature of about 5 μm to about 200 μm.

4. The magnetic recording medium according to claim 1, wherein the rim diameter is about 5 μm to about 8 μm.

5. The magnetic recording medium according to claim 1, wherein the height of the rim is about 150 Å to 225 Å.

6. The magnetic recording medium according to claim 3, wherein the radius of curvature is about 40 μm to about 70 μm.

7. The magnetic recording medium according to claim 1, further comprising an underlayer between the substrate and magnetic layer.

8. The magnetic recording medium according to claim 7, wherein the underlayer comprises a chromium or a chromium-alloy.

9. The magnetic recording medium according to claim 1, further comprising a protective overcoat on the magnetic layer, and a lubricant topcoat on the protective overcoat.

10. The magnetic recording medium according to claim 9, wherein the protective overcoat comprises carbon.

11. The magnetic recording medium according to claim 1, wherein the non-magnetic substrate comprises a nickel-phosphorous plated aluminum-alloy.

12. The magnetic recording medium according to claim 1, wherein the laser textured surface is produced by exposing the upper surface of the substrate to a pulsed laser light beam through a multiple lens focusing system.

13. The magnetic recording medium according to claim 12, wherein the multiple lens focusing system comprises a first companion doublet lens and a second lens, positioned between the first companion doublet lens and the substrate, so that the multiple lens focusing system has a depth of focus greater than that of the first companion doublet lens.

14. The magnetic recording medium according to claim 13, wherein the second lens comprises an aplanatic meniscus lens.

15. The magnetic recording medium according to claim 14, wherein the depth of focus of the multiple lens system is about 30 μm to about 150 μm.

16. The magnetic recording medium according to claim 15, wherein the depth of focus is about 50 μm.

17. The magnetic recording medium according to claim 14, wherein the textured surface comprises a plurality of closely spaced pairs of protrusions.

* * * * *